United States Patent
Neal

(10) Patent No.: US 9,567,774 B1
(45) Date of Patent: Feb. 14, 2017

(54) TEMPORALLY STAGED RAPID PANEL ACCESS FASTENER FOR HIGHLY CURVED PANELS

(71) Applicant: NORTHROP GRUMMAN SYSTEMS CORPORATION, Falls Church, VA (US)

(72) Inventor: Matthew A. Neal, Lancaster, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/214,158

(22) Filed: Jul. 19, 2016

Related U.S. Application Data

(63) Continuation-in-part of application No. 14/713,225, filed on May 15, 2015, now Pat. No. 9,458,648.

(51) Int. Cl.
| | |
|---|---|
| *B64C 1/14* | (2006.01) |
| *E05B 51/02* | (2006.01) |
| *E05C 1/08* | (2006.01) |
| *E05C 9/10* | (2006.01) |
| *E05C 9/18* | (2006.01) |
| *E05C 9/24* | (2006.01) |

(52) U.S. Cl.
CPC ............ *E05B 51/02* (2013.01); *B64C 1/1446* (2013.01); *E05C 1/085* (2013.01); *E05C 9/10* (2013.01); *E05C 9/1841* (2013.01); *E05C 9/24* (2013.01); *E05Y 2900/502* (2013.01)

(58) Field of Classification Search
CPC ...... E05B 51/02; E05B 2051/026; B64C 1/14; B64C 1/1446; B64D 29/06; B64D 29/08; Y10T 403/22; Y10T 403/253; Y10T 403/255

USPC ............................................ 244/129.4, 129.5
See application file for complete search history.

(56) References Cited

U.S. PATENT DOCUMENTS

| | | | | |
|---|---|---|---|---|
| 3,520,223 A | * | 7/1970 | Lilly .................. | F16B 4/002 411/390 |
| 3,643,765 A | * | 2/1972 | Hanchen ............. | F15B 15/262 188/170 |
| 4,174,008 A | * | 11/1979 | Preziosi .............. | F16B 5/0208 24/704.1 |

(Continued)

FOREIGN PATENT DOCUMENTS

NL    1018734 C1    10/2001

*Primary Examiner* — Richard G Davis
(74) *Attorney, Agent, or Firm* — John A. Miller; Miller IP Group, PLC

(57) ABSTRACT

A fastener for highly curved access panels on aircraft or other structures, featuring a bottom-grasping design allowing for an unblemished outer panel surface, simple and rapid pneumatic fastener actuation, built-in clamping pre-load, and full retractability of the fastener inside the supporting structure. The fastener includes a Belleville spring with a piston centrally disposed therein, where the piston and spring deflect outward upon application of pneumatic pressure. A pressure chamber within the piston has inlet and outlet orifices designed so that the pressure in the piston chamber gradually increases, requiring several seconds to reach a pressure which causes locking dogs in the piston to deploy radially into a cavity in the access panel. When pressure is removed, the Belleville spring relaxes, the locking dogs grasp a lip of the cavity, and the access panel is latched onto the structure with a clamping pre-load. A pneumatic sequence for unlatching is also provided.

20 Claims, 12 Drawing Sheets

(56) References Cited

U.S. PATENT DOCUMENTS

| | | | |
|---|---|---|---|
| 4,863,205 A * | 9/1989 | Schron | B66C 1/66 |
| | | | 294/82.28 |
| 4,944,629 A * | 7/1990 | Peveto | B23Q 1/0036 |
| | | | 24/603 |
| 5,267,760 A | 12/1993 | Carlin | |
| 5,765,883 A | 6/1998 | Dessenberger et al. | |
| 5,779,288 A | 7/1998 | Amelio | |
| 5,918,870 A | 7/1999 | Stark | |
| 6,199,798 B1 | 3/2001 | Stephan et al. | |
| 6,641,343 B1 | 11/2003 | Duran | |
| 6,948,685 B2 | 9/2005 | Hawthorne | |
| 7,255,376 B2 | 8/2007 | Pratt et al. | |
| 7,578,475 B2 | 8/2009 | Pratt et al. | |
| 8,056,862 B1 | 11/2011 | Tomerlin et al. | |
| 8,453,973 B2 | 6/2013 | Costabel | |
| 9,303,674 B2 | 4/2016 | Demmeler | |
| 2003/0170074 A1 | 9/2003 | Mills et al. | |
| 2007/0001408 A1 | 1/2007 | Soltis et al. | |
| 2010/0051748 A1* | 3/2010 | Etling | B64C 1/1446 |
| | | | 244/129.5 |
| 2010/0150648 A1* | 6/2010 | Judge | F16B 19/109 |
| | | | 403/374.1 |
| 2012/0054998 A1* | 3/2012 | Tschida | F16B 19/109 |
| | | | 29/426.1 |
| 2012/0112003 A1 | 5/2012 | Affre De Saint Rome | |
| 2013/0305497 A1 | 11/2013 | Coman | |
| 2015/0043960 A1* | 2/2015 | Strobietto | B25J 15/04 |
| | | | 403/31 |
| 2015/0354615 A1 | 12/2015 | Tchouangueu | |

* cited by examiner

TEMPORALLY STAGED RAPID PANEL ACCESS FASTENER FOR HIGHLY CURVED PANELS

CROSS-REFERENCE TO RELATED APPLICATIONS

This application is a continuation-in-part application of U.S. patent application Ser. No. 14/713,225, titled RAPID PANEL ACCESS FASTENER FOR HIGHLY CURVED PANELS, filed May 15, 2015.

BACKGROUND

Field

This invention relates generally to a pneumatically-actuated fastening device and, more particularly, to a fastening device for connecting a work piece to a structure, where the device uses a sequence of pneumatic events to latch or unlatch the work piece, the device is fully retractable in the unlatched position and thus suitable for use around the periphery of a highly curved work piece, and deployment of the device is temporally staged via a pressure chamber with a bleed orifice located in a pneumatic piston.

Discussion

Various industries, including aviation, general construction, electronics, and general manufacturing, use fasteners for a number of different purposes. For example, the aviation industry may find it desirable to quickly, reliably, and robustly attach Outer Mold Line ("OML") frequently-accessed panels and doors to an aircraft's structural frame. The fastenings methods used to attach these OML panels and doors should be secure and capable of avoiding undesired and/or accidental detachment (e.g., during flight). In certain aviation applications, it may also be desirable to reduce aerodynamic drag by using fasteners that hold these OML panels and doors from underneath, thereby avoiding protrusions or penetrations through the OML of the panel or door. In this situation, a fastener could be associated with the structural beam and actuated from beneath the panel to grab or grasp the panel, when actuated.

Panel fasteners may be designed for an initial actuation or installation by a user to a particular clamp-up force. Due to the desire for reliable service, panel fasteners in certain use environments, such as aviation, might then be designed to hold the initial clamp-up force without further application of energizing force until such time as a de-energizing force is positively applied by the user to facilitate selective panel removal.

Panel fasteners have been developed which hold the panel from underneath, as described above. However, in the unlatched position, these fasteners protrude above the structure onto which the panel is to be fastened. Thus, such fasteners are not suitable for highly curved panels, because the multiple protruding fasteners would interfere with and prevent the panel from being placed into position on the structure. A panel fastener is needed which holds the panel from underneath, and which is fully retractable into the supporting structure when in the unlatched position.

DETAILED DESCRIPTION OF THE EMBODIMENTS

The following discussion of the embodiments of the invention directed to a pneumatically-actuated access panel fastener for highly curved panels is merely exemplary in nature, and is in no way intended to limit the invention or its applications or uses. For example, the embodiments discussed below are described in the context of an access panel on an aircraft. However, the disclosed fastener system is also suitable for use in any other application where a bottom-grasping panel fastener is needed—such as automotive, military vehicles, machinery, building construction, etc.

Figure 1:
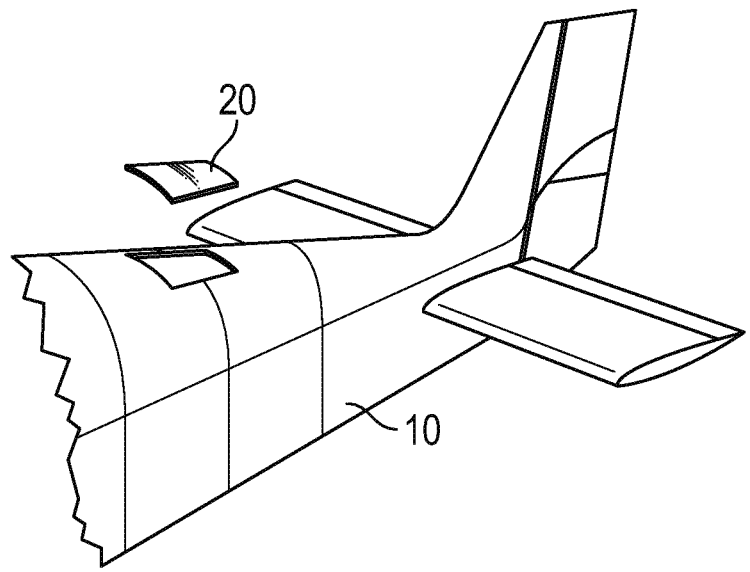
FIG. 1 is an illustration of an aircraft fuselage with a typical access panel shown removed from the fuselage.

FIG. 1 is an illustration of a portion of a fuselage and tail section of an aircraft 10 with an access panel 20 shown removed from the fuselage of the aircraft 10. The access panel 20 could be located anywhere on the aircraft 10—such as on the fuselage, the wing, the tail, etc. The access panel 20 is intended to be removable for access to interior components, most commonly for service or inspection. The panel 20 must be able to be securely fastened in place on the aircraft 10, including the ability to withstand flight loads, vibration, etc.

In order to maintain a completely clean outer surface of the panel 20 for minimum aerodynamic drag, it is desirable to fasten the panel 20 onto the aircraft 10 with fasteners which grasp the panel 20 from underneath. One such bottom-grasping fastener uses strong magnets placed over the fastener location to unlatch ball-lock components of the fastener. However, this design requires precise placement of the external magnets over the internally-located fasteners, which can be difficult to achieve, and may require more than one person to accomplish. Another bottom-grasping fastener simply employs a magnetic attachment of the panel 20 to the aircraft 10, with an inflatable "inner-tube" used to break the magnetic grip and detach the panel 20. However, with large panels, this design requires a large and cumbersome inner-tube. Furthermore, if the inner-tube should develop a leak, it would be very difficult to pry the panel 20 off of the aircraft 10, likely resulting in damage to both.

Other types of access panel fasteners have also been developed, but none offer the desired combination of bottom-grasping, simple actuation, high reliability, built-in clamping pre-load of the panel 20 onto the aircraft 10, and full retractability of the fastener inside the supporting structure. This last feature—retractability—is discussed further below.

Figure 2:
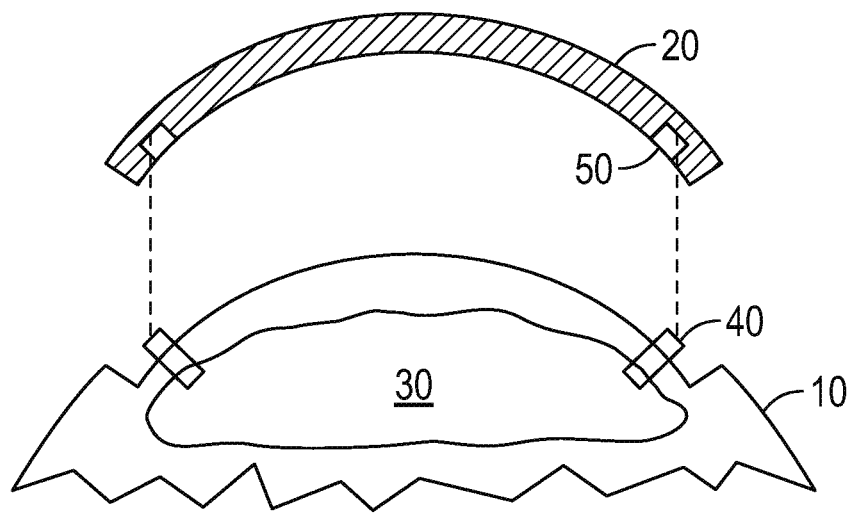
FIG. 2 is an illustration of a curved access panel which shows the problem with traditional bottom-grasping fasteners which do not retract into the supporting structure.

FIG. 2 is an illustration of the access panel 20 in an end-view as if a section were cut through the fuselage of the aircraft 10. FIG. 2 shows the aircraft 10, the access panel 20, a supporting structure portion of the aircraft 10 generally indicated at 30, fasteners 40 and recesses 50 in the panel 20. FIG. 2 illustrates a limitation which exists with the traditional bottom-grasping fastener 40 which does not retract into the supporting structure 30.

Consider a design of the panel 20 which uses four of the fasteners 40—one located near each corner of the panel 20. Two of the fasteners 40 are visible in FIG. 2, while the other two of the fasteners 40 would be located directly behind the two shown. Each of the fasteners 40 must be inserted into one of the recesses 50 in the panel 20, after which a ball-lock or some other feature of the fastener 40 can be actuated to lock the fastener 40 into the recess 50, thereby securing the panel 20 onto the aircraft 10. If the panel 20 is flat, or nearly flat, it is possible to lower the panel 20 down into position against the aircraft 10 while simultaneously fitting all of the recesses 50 over the fasteners 40. This lowering of the panel 20 into position is possible even if the fasteners 40 do not retract into the supporting structure 30, but only if the panel 20 is essentially flat.

However, if the panel 20 is highly curved, as is the case in FIG. 2, the panel 20 cannot be lowered into position if the fasteners 40 do not retract into the supporting structure 30. As can be seen in FIG. 2 and readily understood by one skilled in the mechanical arts, the non-retractable fasteners 40 will interfere with the material surrounding the recesses 50, thereby preventing the panel 20 from being lowered into position. For an access panel 20 which is highly curved, a fastener design is needed which fully retracts into the supporting structure 30, allowing the access panel 20 to be freely placed into position, after which the fastener extends into and latches onto the panel 20.

Figure 3:
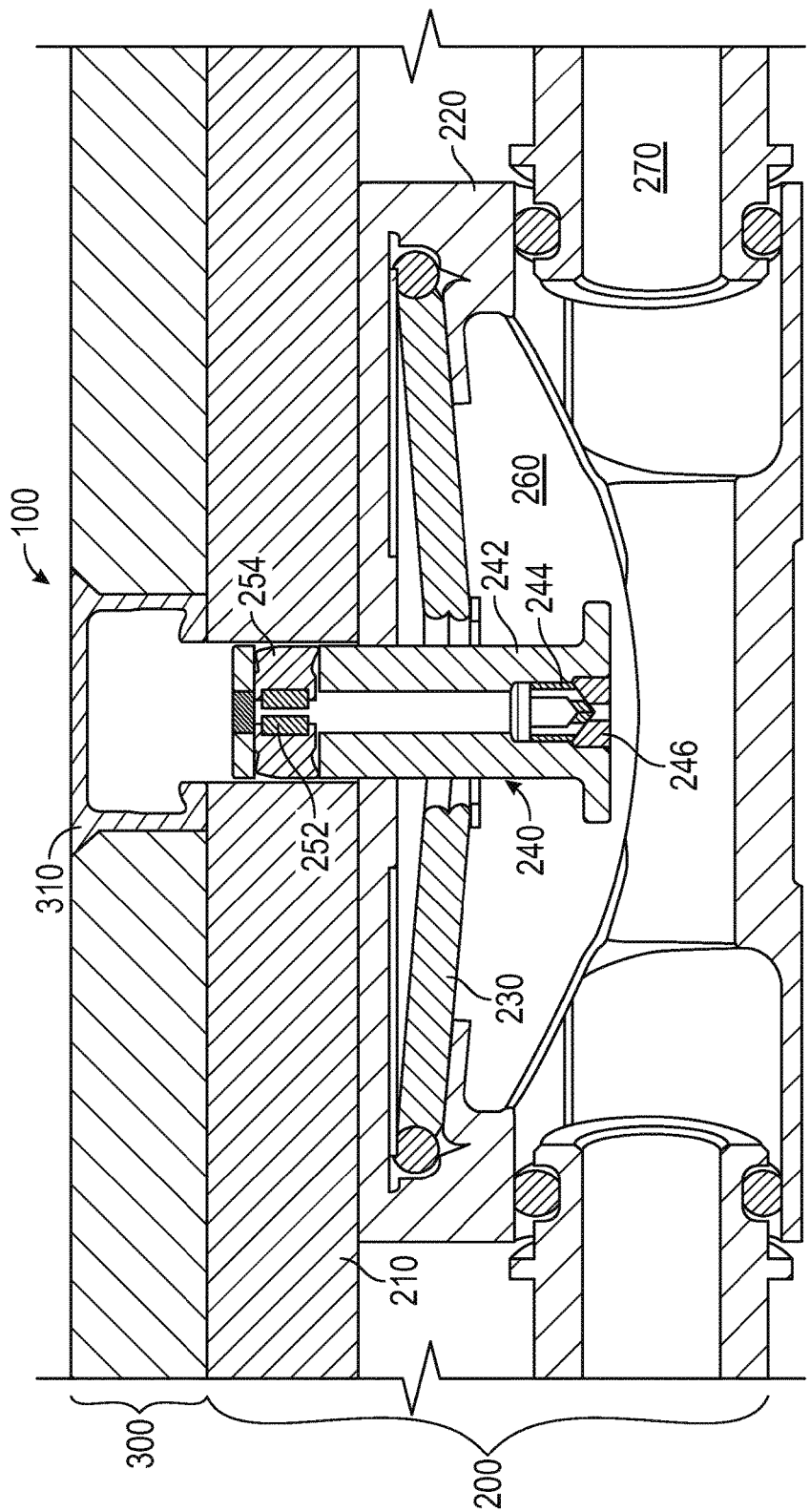
FIG. 3 is an illustration of an access panel fastener in a first position, Stage 0, unlatched and fully retracted into its supporting structure.

FIG. 3 is an illustration of a fastener 100 which meets all of the requirements outlined above—including full retractability, bottom-grasping, simple and rapid actuation for both latching and unlatching, high reliability and built-in clamping pre-load. FIG. 3 shows the fastener 100 in a first position, where the device is fully retracted and unlatched. FIGS. 4-9 show the fastener 100 in other positions, including intermediate positions and a fully latched position.

The term "pneumatically-actuated" is used herein to indicate that the fastener 100 is selectively actuated, in at least one embodiment, using pneumatic power provided by pressurized air, nitrogen, or some other gas. It should be understood, however, that hydraulic power, using hydraulic oil, water, or any other suitable fluid for a particular use environment, may also be employed without deviating from the basic design principles of the fastener 100.

References to the fastener 100 will henceforth describe the entire fastener assembly, including those components which are mounted to a fixed structure 200, and those components which are incorporated into a removable panel 300. For comparison to FIGS. 1 and 2, the fixed structure 200 corresponds to the aircraft 10 and the supporting structure 30, and the removable panel 300 corresponds to the access panel 20. For visual clarity, some element numbers may be omitted from various of the figures, but should be understood to be analogously applicable to all figures where a particular numbered element is present.

The relative terms "lower" and "upper", "down" and "up", etc., are used herein to refer to directions toward the bottom and top, respectively, of FIG. 3 and similarly oriented figures. No absolute direction is implied or intended by use of these directional terms, beyond orienting the description herein, and one of ordinary skill in the art will be readily able to re-orient to a fastener 100 which is not configured in space as shown in the figures.

The fastener 100 includes an upper housing 210 and a lower housing 220, which are part of the fixed structure 200. The lower housing 220 fixes a Belleville spring 230 around its periphery. A piston assembly 240 is disposed through a central aperture in the Belleville spring 230, such that the piston assembly 240 can slide up and down through the Belleville spring 230 and through an opening in the upper housing 210. Below the lower housing 220, the Belleville spring 230 and the piston assembly 240 is a chamber 260. The chamber 260 is in fluid communication with a pneumatic line 270, through which pneumatic pressure is selectively provided, as will be discussed in detail below.

It is to be understood that the pneumatic pressure in the pneumatic line 270 is provided by a pneumatic supply system including at least one pump or compressor, a tank or plenum, and at least one valve. None of the elements of the pneumatic supply system are shown in FIG. 3 or subsequent figures, as these elements would be clearly understood by one skilled in the art, and are not germane to the design of the fastener 100. It is also to be understood that multiple units of the fastener 100 can be coupled to the pneumatic line 270—so that all of the fasteners 100 used on a particular access panel can be simultaneously latched or unlatched with the prescribed sequence of pneumatic pressures.

The piston assembly 240 includes a piston body 242, a valve 244, and a magnetic seat 246. The magnetic seat 246 includes a central opening 248, which is open at the bottom to whatever pneumatic pressure exists in the chamber 260. The piston body 242 includes a central passage 250 extending from one end of the piston body 242 to the other end. When the valve 244 is lifted off of the magnetic seat 246, pneumatic pressure from the chamber 260 passes through the opening 248 in the magnetic seat 246 and into the central passage 250. The piston assembly 240 also includes a plurality of magnetic pills 252, each of which is coupled to a locking dog 254. Two each of the pills 252 and dogs 254 are shown in the figures; however, more could be used. The pills 252 and dogs 254 are shown retracted within the piston assembly 240 in FIG. 3, but deploy radially outward for latching, as will be shown in later figures and discussed below. The magnetic pills 252 are held in a retracted position by a top magnet 256 which is fitted into the upper end of the piston body 242. The magnetic pills 252 may also be held in a retracted position by their magnetic attraction to each other, and the top magnet 256 may be replaced by a non-magnetic bumper which serves to keep the magnetic pills 252 centered within the piston body 242 when retracted.

Figure 8:
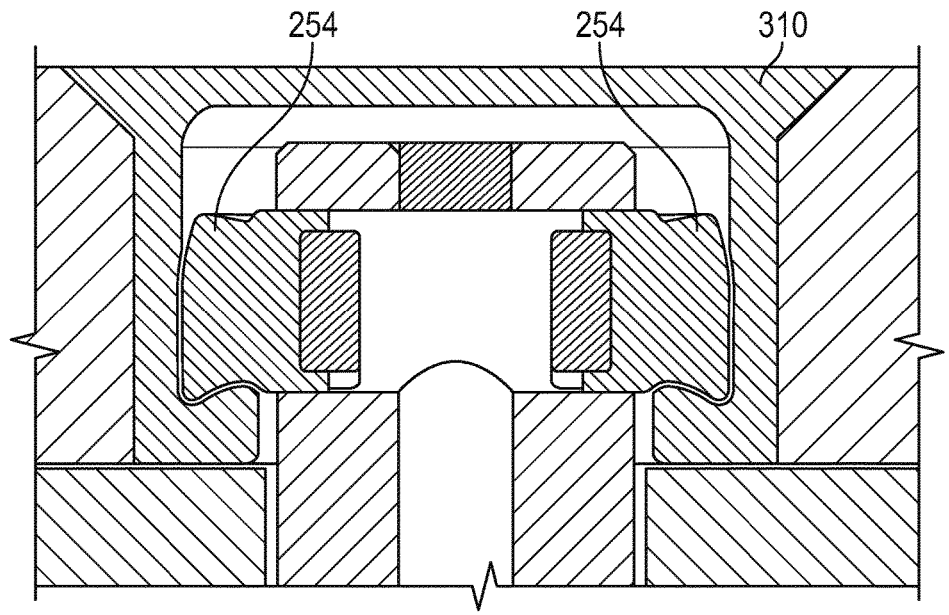
FIG. 8 is an illustration of the upper end of the fastener in a fifth position, Stage 4, where a reduction in the pneumatic pressure causes the Belleville spring to relax and the locking dogs to latch onto the retainer cavity.

The removable panel 300 includes a retainer cavity 310, into which the upper end of the piston body 242 travels during the latching sequence. The retainer cavity 310 has a profile shape which is designed to correspond to the profile of the locking dogs 254, such that the dogs 254 can pull down on the panel 300 and in this condition the dogs 254 are prevented from retracting radially back into the piston assembly 240. This feature is shown in FIG. 8 and discussed below.

The following discussion describes the sequence of pneumatic and magnetic events and motions which are involved in latching and unlatching the fastener 100. This discussion refers at various points to FIGS. 3-9, which show the fastener 100 in different stages of deployment. FIG. 10 shows the sequence of pneumatic events in bar chart form, with accompanying description.

In the following discussion, a "positive" pressure is above a resting pressure (e.g., the atmospheric pressure of about 14.7 pounds per square inch, or about 101 kiloPascals, will be a resting pressure in many use environments, though resting pressure may vary somewhat, depending on altitude, ambient temperature, and other contributory factors). Specific pneumatic pressure values cited below are exemplary of one embodiment which has been demonstrated to operate as described. All pressures should be understood to be within a reasonable range of the cited values—such as +/−5-10 psi.

In FIG. 3, the fastener 100 is shown in a fully retracted and unlatched position. At this point, there is no pneumatic pressure (that is, no positive pressure above ambient) in the chamber 260. As discussed at length above, the ability of the fastener 100 (specifically the piston assembly 240) to fully retract within the housings 210/220 is critical for applications where the removable panel 300 is highly curved. As shown in FIG. 3, the panel 300 is placed in position on the upper housing 210, but the panel 300 is not fastened in any way to the underlying fixed structure 200. This configuration is referred to as Stage 0.

Figure 4:
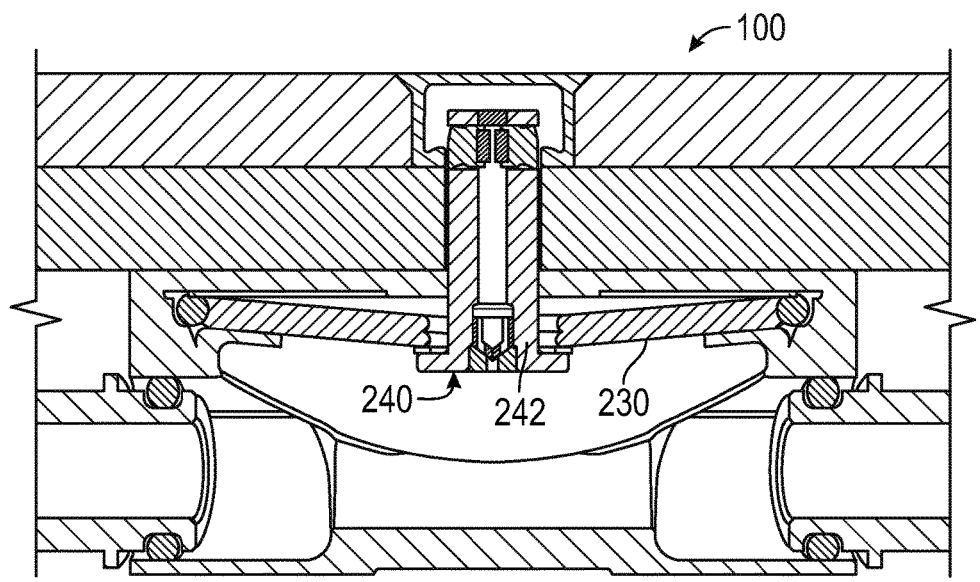
FIG. 4 is an illustration of the access panel fastener of FIG. 3 in a second position, Stage 1, where a piston has deployed from the structure up into a retainer cavity in the panel, but the fastener is not yet latched.

In FIG. 4, a small pneumatic pressure, such as 10 psi, is provided in the chamber 260. This small pressure is enough to cause the piston assembly 240 to move upward through the central aperture in the Belleville spring 230 and through the opening in the upper housing 210. The piston assembly 240 moves upward until a lower flange on the piston body 242 contacts a bottom surface of the Belleville spring 230. In this configuration, Stage 1, the upper end of the piston body 242, including the magnetic pills 252 and the locking dogs 254, is located partially up inside the retainer cavity 310. However, the pills 252 and dogs 254 have not deployed radially outward (and in fact cannot deploy as the dogs 254 would contact the cavity 310), and the panel 300 is not latched to the fixed structure 200 in the Stage 1 configuration of FIG. 4.

Figure 5:
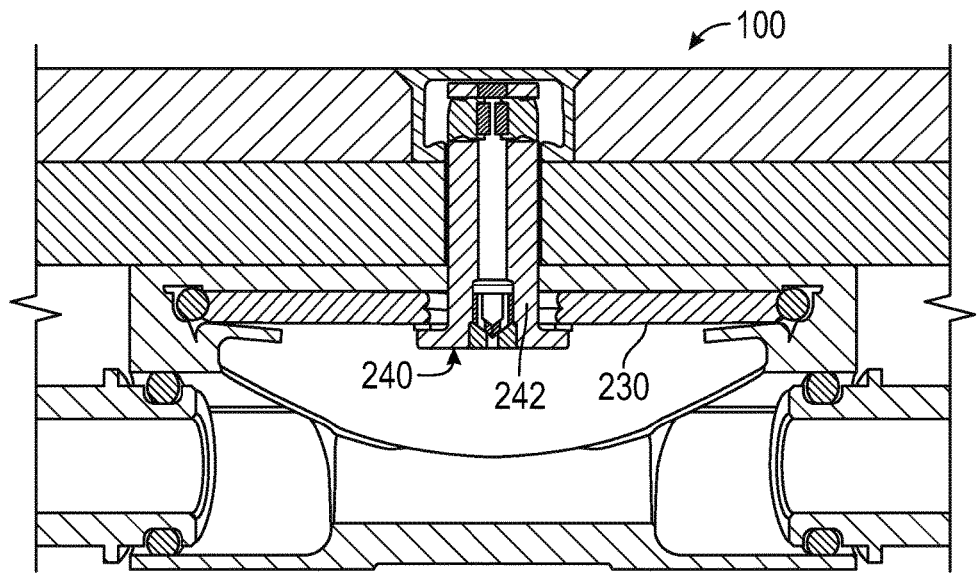
FIG. 5 is an illustration of the access panel fastener of FIG. 3 in a third position, Stage 2, where an applied pneumatic pressure is sufficient to flex a Belleville spring upward, allowing further upward movement of the piston.

FIG. 5 shows the fastener 100 in Stage 2 of deployment. At Stage 2, a moderate pneumatic pressure of about 100 psi has been provided in the chamber 260. This pressure is sufficient to cause the Belleville spring 230 to compress or flex upward, as can be seen by examining the difference between FIGS. 4 and 5. It is noteworthy that the pressure in the chamber 260 acts upon the entire lower surface of the Belleville spring 230 along with the bottom of the piston body 242. Thus, for a given desired force, the Belleville spring 230 enables fastener operation at a lower pneumatic pressure than would be required if a coil spring were used, as the coil spring would not provide a pressure-responsive surface. As a result of the Belleville spring 230 flexing upward, the upper end of the piston body 242, including the magnetic pills 252 and the locking dogs 254, has moved slightly farther upward and is now fully inside the retainer cavity 310. In the Stage 2 configuration of FIG. 5, the valve 244 is still closed, the pills 252 and dogs 254 have not deployed radially outward, and the panel 300 is not latched to the fixed structure 200.

Figure 6:
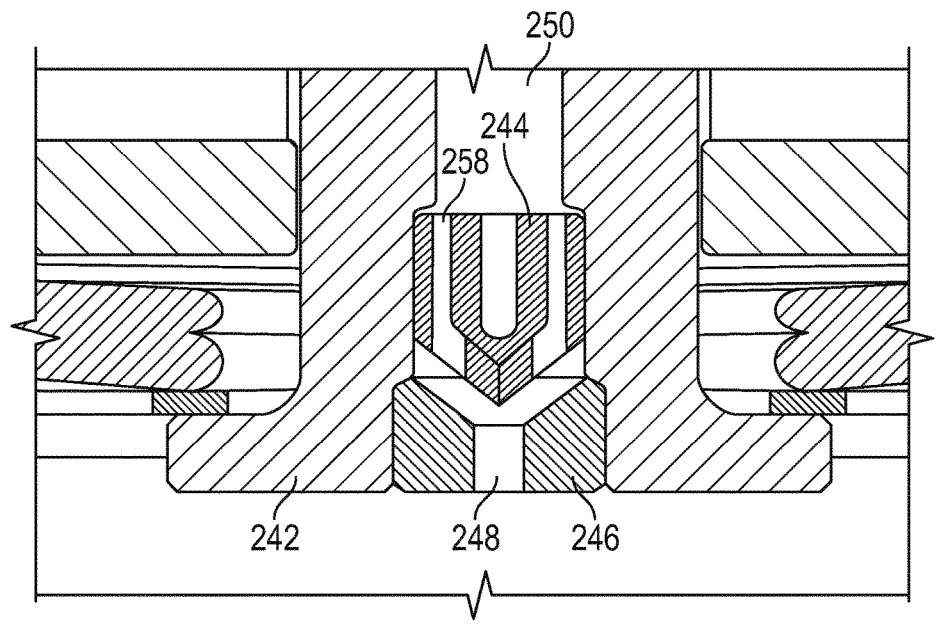
FIG. 6 is an illustration of the lower end of the fastener in a fourth position, Stage 3, where the applied pneumatic pressure is sufficient to cause a magnetically-seated valve in the piston to open.

FIG. 6 is a close-up of the lower end of the piston assembly 240 at Stage 3. At Stage 3, an increased moderate pneumatic pressure of about 120 psi has been provided in the chamber 260. This pressure is sufficient to cause the valve 244 to lift off of the magnetic seat 246. With the valve 244 open, pneumatic pressure passes through the central opening 248 in the magnetic seat 246, through ports 258 in the valve 244, and up through the central passage 250 in the piston body 242. The design of the valve 244 is significant in that the pneumatic pressure required for valve opening is higher than the pneumatic pressure at which valve closing occurs. The valve 244 need not necessarily be magnetically-seated (for example, a spring-loaded design could be used), but the characteristic relationship of higher opening pressure and lower closing pressure is required.

Figure 7:
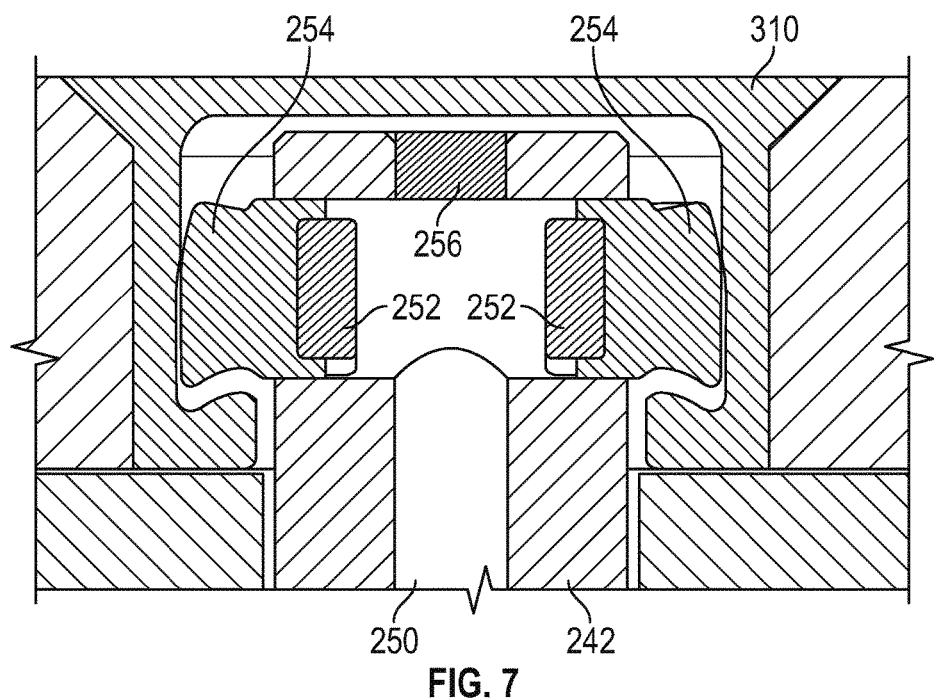
FIG. 7 is an illustration of the upper end of the fastener in the fourth position, Stage 3, where the pneumatic pressure causes a plurality of magnetic pills and attached locking dogs to deploy radially outward.

FIG. 7 is a close-up of the upper end of the piston assembly 240 at Stage 3. At Stage 3, as discussed above, the valve 244 is open and pneumatic pressure passes up through the central passage 250 in the piston body 242. This pressure, which is felt by the inward surfaces of the magnetic pills 252, is sufficient to cause the magnetic pills 252 to break free of the top magnet 256 (and/or their magnetic attraction to each other) and deploy radially outward. The locking dogs 254, which are attached to the magnetic pills 252, are thus forced radially outward into the retainer cavity 310. The geometric shape of the locking dogs 254 and the lower lip of the retainer cavity 310, visible in FIG. 7, are significant—as will become apparent in the following discussion and figures.

FIG. 8 is a close-up of the upper end of the piston assembly 240 at Stage 4. At Stage 4, the pneumatic pressure in the chamber 260 has been reduced to a lower moderate level of about 70 psi. The pneumatic pressure at Stage 4 is still sufficient to keep the valve 244 open; this is because the valve 244 has moved away from the magnetic seat 246 and therefore less pressure is needed to keep the valve 244 open than to open it. At Stage 4, with the valve 244 open, the pneumatic pressure felt by the inward surfaces of the magnetic pills 252 is sufficient to maintain the magnetic pills 252 and the locking dogs 254 forced radially outward into the retainer cavity 310. However, the reduction of pneumatic pressure at Stage 4 allows the Belleville spring 230 to relax partially back toward its unflexed shape. Because the Belleville spring 230 has relaxed, the upper end of the piston assembly 240 has moved down slightly, thus causing the locking dogs 254 to engage with the mating lower lip of the retainer cavity 310. Due to the mating shape of these components, the locking dogs 254 are locked in the radial outward position, and cannot retract radially inward back into the piston assembly 240 until the Belleville spring 230 and the piston assembly 240 are again flexed upward by a higher pneumatic pressure (during unlatching, discussed later).

Figure 9:
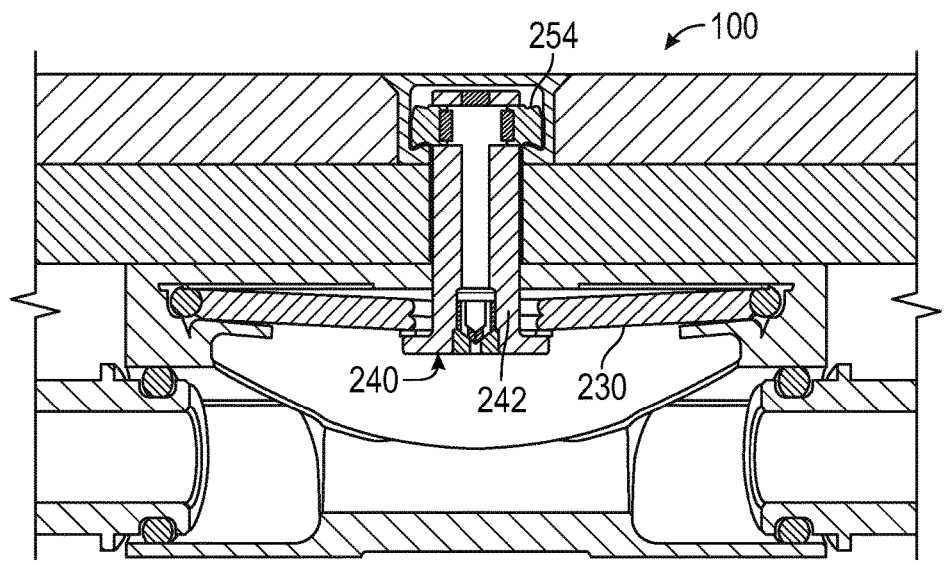
FIG. 9 is an illustration of the access panel fastener of FIG. 3 in a sixth position, Stage 5, where the pneumatic pressure has been removed, the valve is closed, and the access panel is latched to the supporting structure by the fastener.
Figure 10:
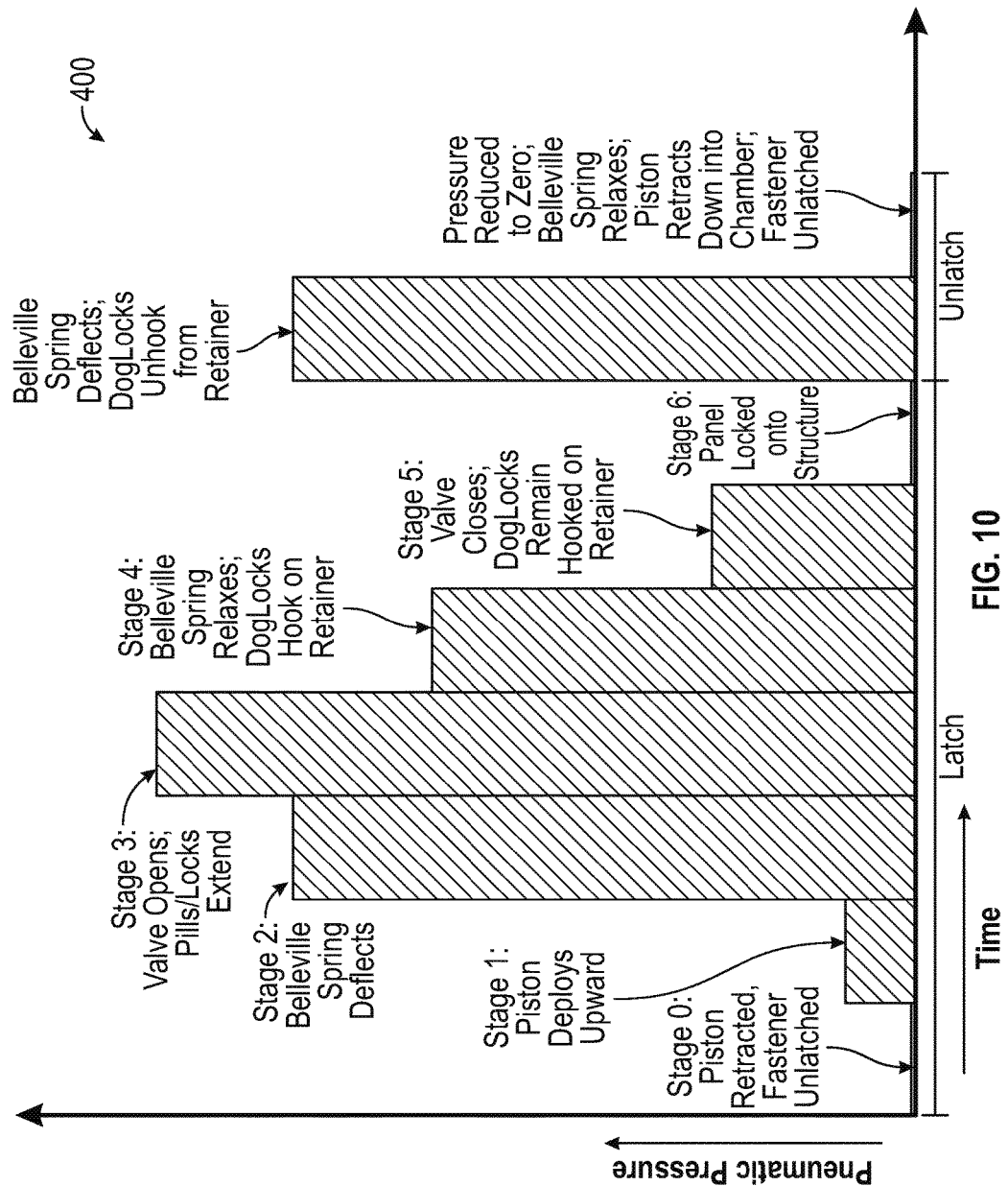
FIG. 10 is a bar chart showing the sequence of pneumatic pressures used to latch and unlatch the panel fastener of FIGS. 3-9.

FIG. 9 shows the fastener 100 in Stage 5, where a lower pneumatic pressure of about 30 psi is provided in the chamber 260. At Stage 5, the valve 244 closes. However, even with little or no pneumatic pressure on the inward surfaces of the magnetic pills 252, the locking dogs 254 are locked in the radial outward position, and cannot retract radially inward back into the piston assembly 240, due to the mating geometry of the dogs 254 and the retainer cavity 310 as discussed above.

It is important to note that, at Stages 4 and 5, the Belleville spring 230 is still partially flexed. This is because the contact of the locking dogs 254 with the lower lip of the retainer cavity 310 prevents the piston body 242 from moving down enough to allow the Belleville spring 230 to fully relax. The partial flexure of the Belleville spring 230 produces a downward or tensile load in the piston body 242, which provides a clamping pre-load holding the removable panel 300 down onto the fixed structure 200.

At Stage 6 of the fastener deployment, the pneumatic pressure in the chamber 260 is reduced to zero. The geometry of the fastener 100 is the same at Stage 6 as it was at Stage 5, shown in FIG. 9. At Stage 6, the fastener 100 is fully latched and secure, ready for flight operations. In this configuration, the panel 300 is fastened to the fixed structure 200 with a clamping pre-load applied by the partially flexed Belleville spring 230, and no pneumatic pressure or power is needed to maintain this latched condition. Precautions may be taken at Stage 6 to ensure that pneumatic pressure cannot be provided to the chamber 260 during flight operations. These precautions may include locking out power to the pneumatic pump, opening an exhaust valve on the tank or plenum, etc.

Another significant feature of the disclosed device is the ability to unlatch the fastener 100 through a prescribed sequence of pneumatic events, again without requiring special tools or other complications. The unlatching sequence begins from Stage 6, where the removable panel 300 is fastened to the fixed structure 200, and no pneumatic pressure is provided in the chamber 260. From this configuration, a moderate pressure of about 100 psi is provided in the chamber 260. This pressure is sufficient to cause the Belleville spring 230 to compress or flex upward, as was shown previously in Stage 2 deployment depicted in FIG. 5. As a result of the Belleville spring 230 flexing upward, the magnetic pills 252 and the locking dogs 254 lift, thereby releasing the locking dogs 254 from the lower lip of the retainer cavity 310. As discussed previously, in the Stage 2 configuration of FIG. 5, the valve 244 is still closed; therefore, as soon as the locking dogs 254 release from the lower lip of the retainer cavity 310, the pills 252 and dogs 254 retract radially inward back inside the piston body 242 due to the magnetic attraction of the top magnet 256 and/or the attraction of the magnetic pills 252 to each other.

From the Stage 2 configuration described above, the pneumatic pressure in the chamber 260 is continuously decreased down to zero in order to complete the unlatching process. It is important to remember that the valve 244 never opens in the unlatching process, as the Stage 3 pressure (about 120 psi) is never applied. As the pneumatic pressure decreases from Stage 2, the Belleville spring 230 will return to its fully relaxed state at around 70 psi, and the piston assembly 240 will retract back down into the chamber 260 at about 10 psi. A slight vacuum could be provided in the chamber 260 to cause the piston assembly 240 to retract, if gravity does not do so. When the pneumatic pressure in the chamber 260 has dropped to zero, the fastener 100 will have returned to its configuration at Stage 0, shown previously in FIG. 3. In this configuration, the removable panel 300 is not fastened to the fixed structure 200, and the panel 300 can be removed if so desired.

FIG. 10 is a bar chart 400 with pneumatic pressure on the vertical axis and time on the horizontal axis, showing the sequence of pneumatic pressures used to latch and unlatch the fastener 100. Each of the bars on FIG. 10 includes a reference to the stage number and a description of the fastener configuration at each stage, to further assist in providing a full understanding of the operation and features of the fastener 100.

Figure 11:
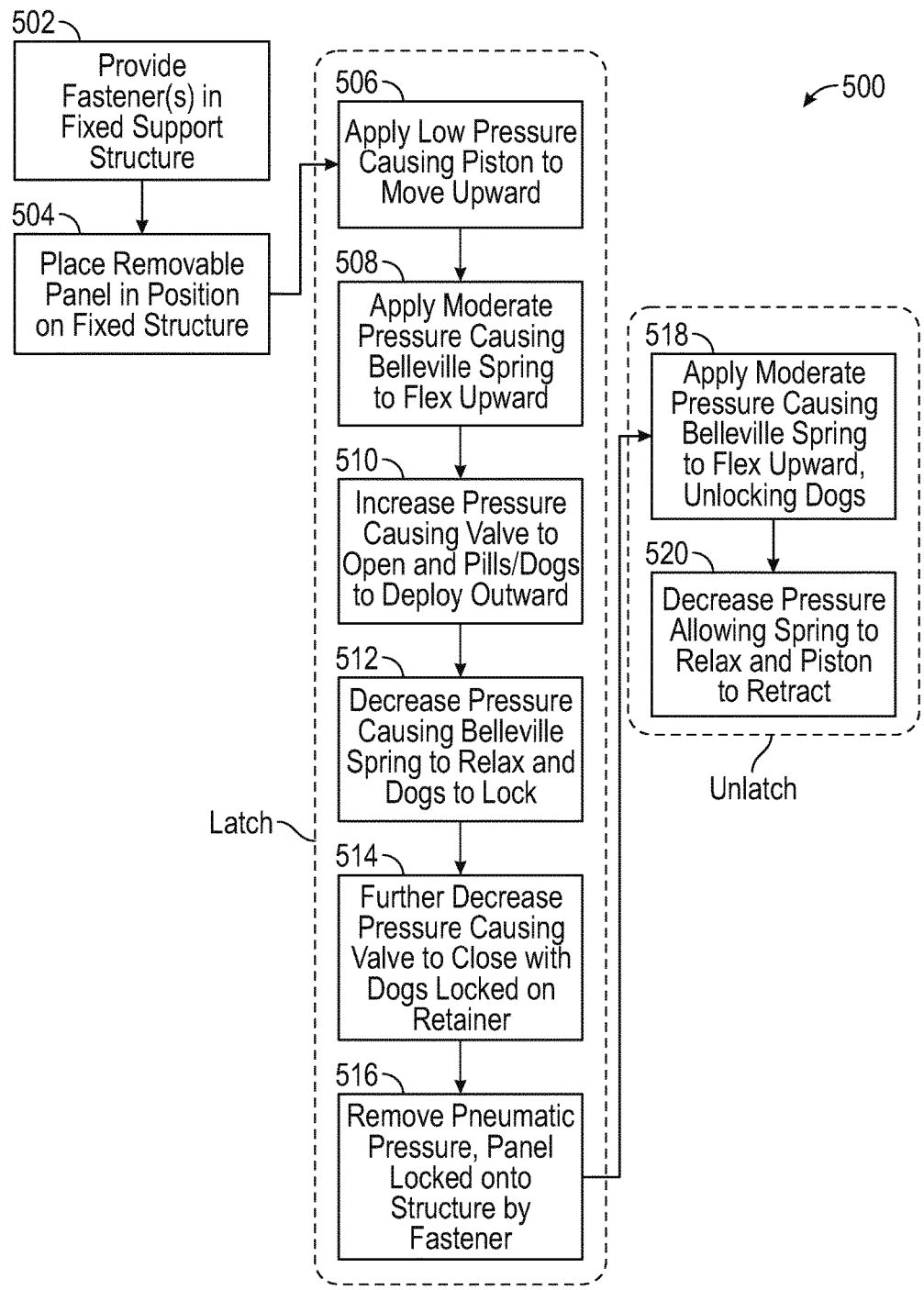
FIG. 11 is a flowchart diagram of a method used to latch and unlatch the panel fastener of FIGS. 3-9.

FIG. 11 is a flowchart diagram 500 of a method used to latch and unlatch the fastener 100. At box 502, one or more of the fasteners 100 are provided in a fixed structure 200. At box 504, a removable panel 300 is placed in position on the fixed structure 200. The latching sequence begins at box 506, Stage 1 of deployment, where a low pneumatic pressure of about 10 psi is provided to the chamber 260, causing the piston assembly 240 to move upward through the central aperture in the Belleville spring 230 and the opening in the upper housing 210.

At box 508, Stage 2, a moderate pneumatic pressure of about 100 psi is provided in the chamber 260. This Stage 2 pressure causes the Belleville spring 230 to compress or flex upward, such that the upper end of the piston body 242, including the magnetic pills 252 and the locking dogs 254, moves fully up inside the retainer cavity 310. At box 510, Stage 3, an increased moderate pneumatic pressure of about 120 psi is provided in the chamber 260. This pressure causes the valve 244 to lift off of the magnetic seat 246, so that the pressure passes up through the central passage 250 in the piston body 242. The pressure at Stage 3 is felt by the inward surfaces of the magnetic pills 252, which causes the magnetic pills 252 and locking dogs 254 to break free of the top magnet 256 (and/or their magnetic attraction to each other) and deploy radially outward.

At box 512, Stage 4, the pneumatic pressure in the chamber 260 is reduced to a lower moderate level of about 70 psi. The valve 244 stays open at Stage 4, but the Belleville spring 230 relaxes back toward its unflexed shape, thus causing the locking dogs 254 to engage with the mating lower lip of the retainer cavity 310. This pulls the removable panel 300 down onto the fixed structure 200. At box 514, Stage 5, a lower pneumatic pressure of about 30 psi is provided in the chamber 260. At Stage 5, the valve 244 closes, but the magnetic pills 252 and the locking dogs 254 are locked in the radial outward position in the retainer cavity 310, holding the removable panel 300 down onto the fixed structure 200. At box 516, Stage 6, the pneumatic pressure is removed from the chamber 260, and the removable panel 300 is fully latched onto the fixed structure 200 by the fastener 100. In the case of an access panel on an aircraft, the fastener system is flight-ready.

The unlatching sequence begins at box 518, where a moderate pneumatic pressure of about 100 psi is provided in the chamber 260. This pressure causes the Belleville spring 230 to compress or flex upward, such that the locking dogs 254 are freed from their position in the retainer cavity 310. At box 520, the pneumatic pressure in the chamber 260 is reduced to allow the Belleville spring 230 to relax back to its unflexed shape, and the pneumatic pressure is further reduced to allow the piston assembly 240 to retract back into the chamber 260, thus completing the unlatching sequence.

It may be desirable in some applications to temporally stage the deployment sequence of the access panel fastener while minimizing the number of pneumatic pressure commands. In particular, it would be beneficial to include a time delay between the upward flexing of the Belleville spring and the outward deployment of the locking dogs, while having both of these steps accomplished at the same high applied pressure in the pneumatic line 270.

Figure 12:
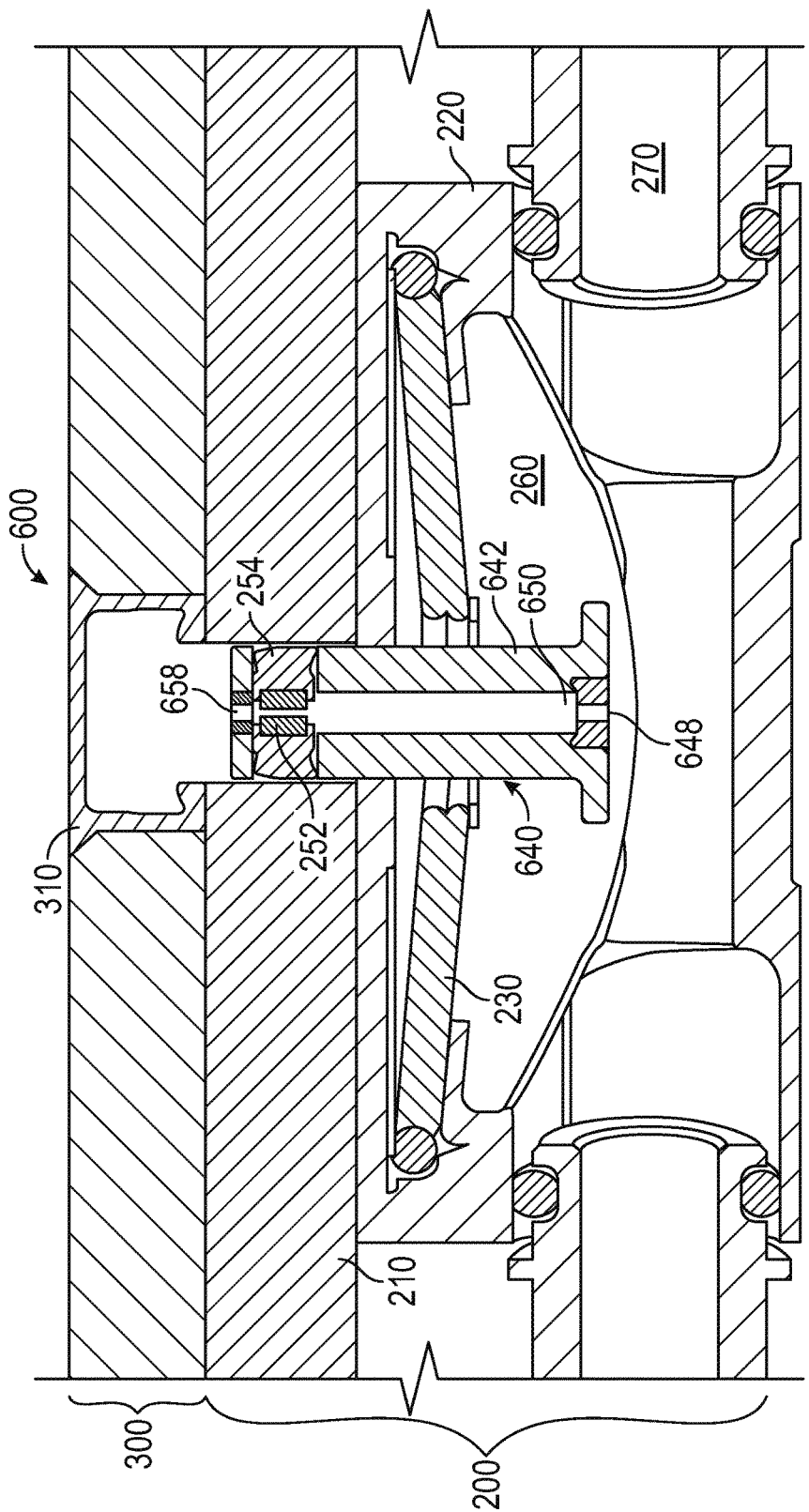
FIG. 12 is an illustration of a second embodiment of an access panel fastener featuring temporally staged deployment via a pressure chamber with a bleed orifice, where the fastener is in a first position, Stage 0, unlatched and fully retracted into its supporting structure.

FIG. 12 is an illustration of a second embodiment of an access panel fastener 600 featuring temporally staged deployment via a pneumatic pressure chamber with a bleed orifice in the piston, where the fastener is in a first position, Stage 0, unlatched and fully retracted into its supporting structure.

The fastener 600 is the same as the fastener 100 of FIGS. 3-9 except that the piston design has been modified in two main ways; the valve 244 (of the fastener 100) has been eliminated, and an orifice has been added at the top of the piston. As will be discussed in detail below, the fastener 600 is not only simpler in construction, but also enables a simplified sequence of pneumatic pressures for latching.

In FIGS. 12-15, all item reference numbers are the same as those of FIGS. 3-9 except for the piston parts which have changed. For example, the fixed structure 200 with its upper and lower housings, the Belleville spring 230, the removable panel 300 and its retainer cavity 310, are all unchanged from the design of the fastener 100.

The fastener 600 includes a piston assembly 640 with a piston body 642 having a lower orifice 648 at the bottom, but no valve as in the previous design. Thus, pneumatic pressure from the chamber 260 is free to flow into a piston chamber 650 via the lower orifice 648. The piston body 642 now also includes an upper orifice 658 at the top end. When pneumatic pressure flows into the piston chamber 650 via the lower orifice 648, some of the pressurized air volume flows out the top of the piston chamber 650 via the upper orifice 658. The orifices 648 and 658 are designed so that, when a high pneumatic pressure is applied to the chamber 260, a significant time delay is experienced before enough pressure develops in the piston chamber 650 to deploy the locking dogs 254 radially outward. In one non-limiting design embodiment, the lower orifice 648 has a diameter of 0.01 inches and the upper orifice 658 has a diameter of 0.019 inches, resulting in a time lag of about five seconds.

The time lag produced by the fastener 600 is desirable because it allows sufficient time to ensure that the piston 640 has fully deployed upward into the cavity 310, including the upward flexing of the Belleville spring 230, before the locking dogs 254 deploy radially outward. Furthermore, the design of the fastener 600 enables a simplified sequence of pneumatic pressure commands for latching. Specifically, it is no longer necessary to apply different pressures in the pneumatic line 270 for Stage 2 (Belleville spring flexure) and Stage 3 (locking dog deployment), as shown previously on FIG. 10 for the fastener 100. In the new design of the fastener 600, a single pneumatic line pressure can be applied which flexes the Belleville spring 230 upward; then, a few seconds later, pressure accumulates in the piston chamber 650 which is sufficient to deploy the locking dogs 254 outward. The following figures illustrate the complete latching sequence.

Figure 13:
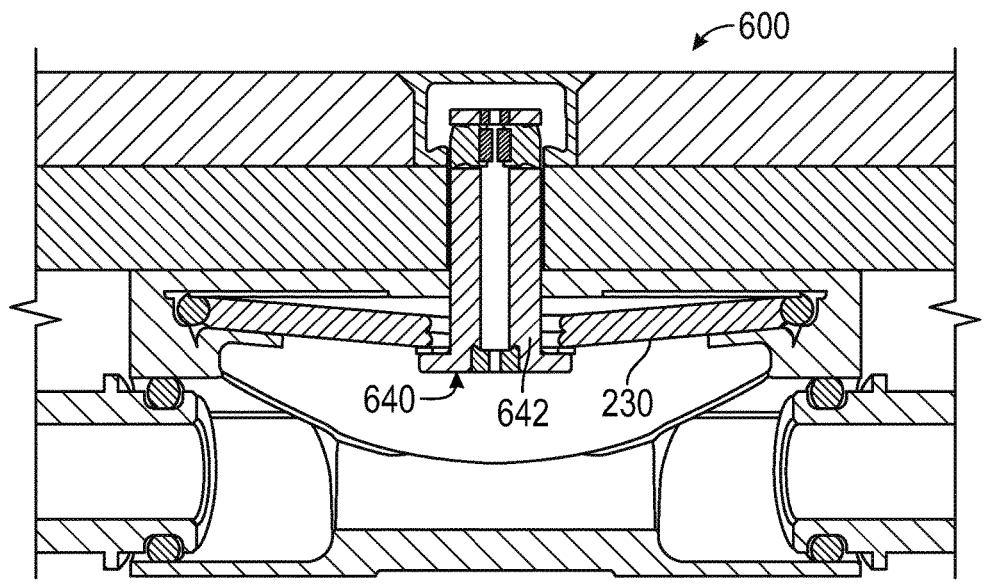
FIG. 13 is an illustration of the access panel fastener of FIG. 12 in a second position, Stage 1, where a piston has deployed from the structure up into a retainer cavity in the panel, but the fastener is not yet latched.

FIG. 13 is an illustration of the access panel fastener 600 of FIG. 12 in a second position, Stage 1, with a low pneumatic pressure in the chamber 260, where the piston 640 has deployed from the fixed structure 200 partway up into a retainer cavity 310 in the panel 300, but the fastener 600 is not yet latched. In the Stage 1 position of FIG. 13, the pneumatic pressure in the chamber 260 is not sufficient to flex the Belleville spring 230 upward, and the piston 640 is therefore not fully extended into the cavity 310.

Figure 14:
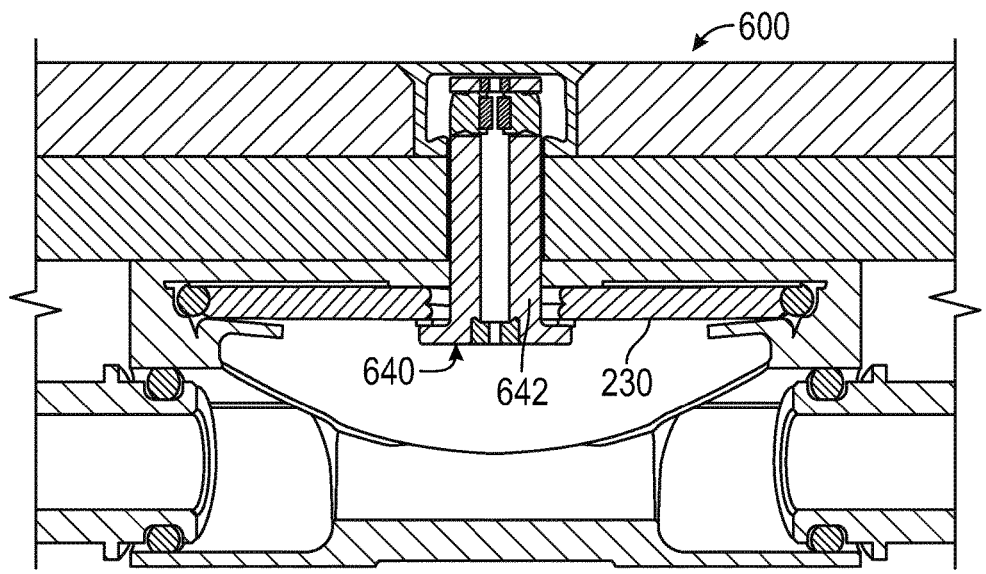
FIG. 14 is an illustration of the access panel fastener of FIG. 12 in a third position, Stage 2, where an applied pneumatic pressure is sufficient to flex a Belleville spring upward, allowing further upward movement of the piston, but pressure within a chamber in the piston has not yet reached a level sufficient to deploy the locking dogs.

FIG. 14 is an illustration of the access panel fastener 600 of FIG. 12 in a third position, Stage 2, where an applied pneumatic pressure of about 100 psi is sufficient to flex the Belleville spring 230 upward, allowing further upward movement of the piston 640, but pressure within the piston chamber 650 has not yet reached a level sufficient to deploy the locking dogs 254. At Stage 2, pressurized air is flowing into the piston chamber 650 through the lower orifice 648 and flowing out of the piston chamber 650 through the upper orifice 658, and the pressure within the piston chamber 650 is slowly rising.

Figure 15:
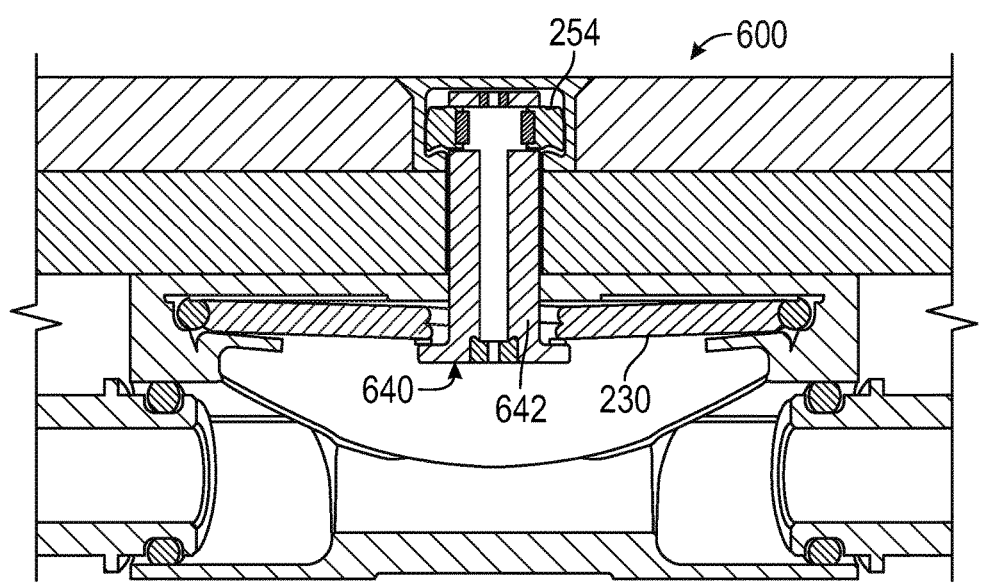
FIG. 15 is an illustration of the access panel fastener of FIG. 12 in a fourth position, Stage 3, where the pneumatic pressure within the chamber in the piston has reached a level sufficient to deploy the locking dogs radially outward.

FIG. 15 is an illustration of the access panel fastener 600 of FIG. 12 in a fourth position, Stage 3, where the pneumatic pressure within the piston chamber 650 has reached a level sufficient to deploy the locking dogs 254 radially outward. As described above, the pneumatic pressure signal of about 100 psi applied in the pneumatic line 270 and the chamber 260 is the same at Stage 3 as it was at Stage 2. Stage 3 represents the time at which the pressure in the piston chamber 650 has reached a level, about 30 psi, sufficient to separate the magnetic pills 252 and cause the locking dogs 254 to deploy outward. The time lag between Stage 2 flexing of the Belleville spring 230 and Stage 3 deployment of the locking dogs 254 is a natural and desirable consequence of the design of the orifices 648 and 658.

Figure 16:
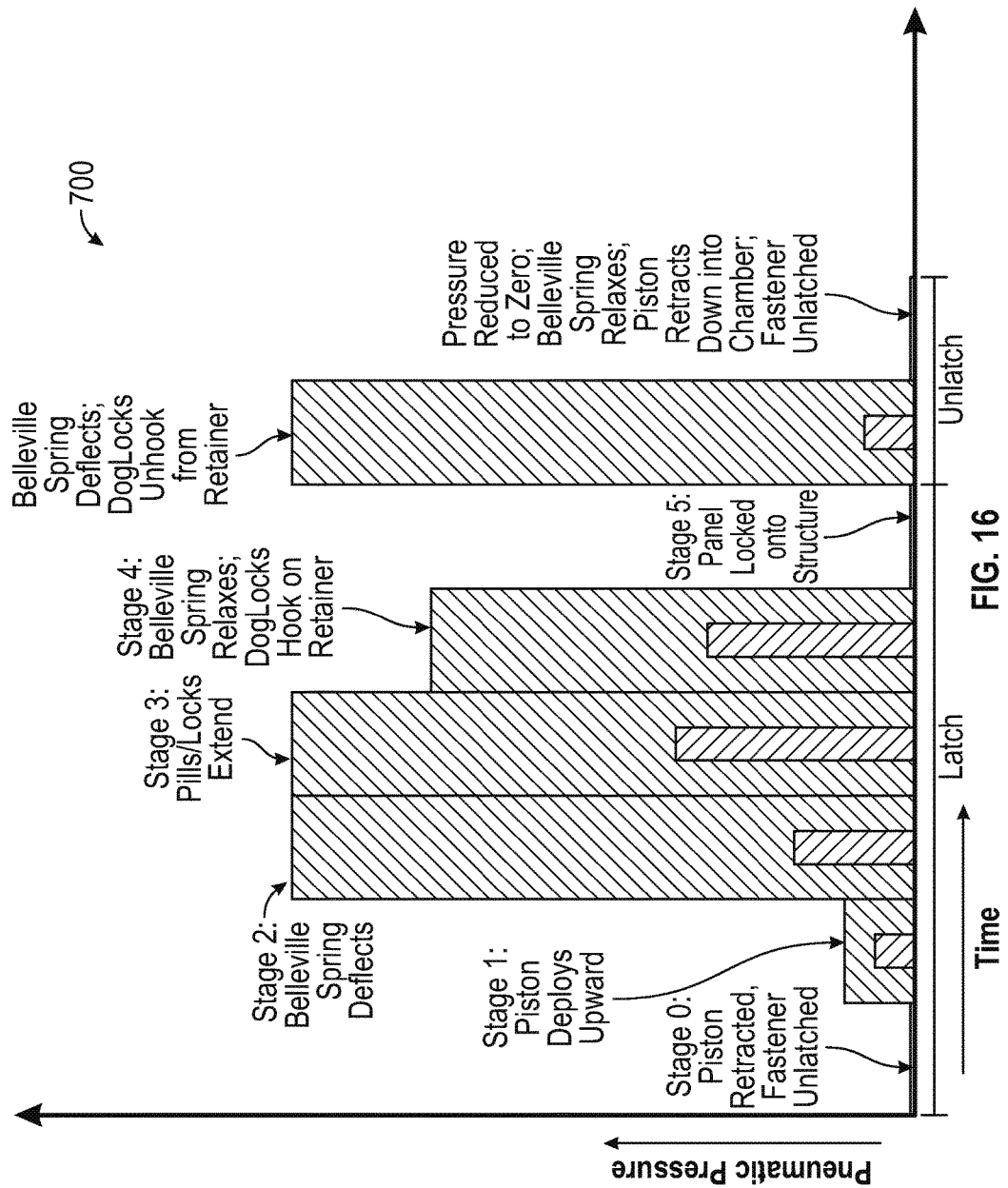
FIG. 16 is a bar chart showing the sequence of pneumatic pressures used to latch and unlatch the panel fastener of FIGS. 12-15.

FIG. 16 is a bar chart 700 showing the sequence of pneumatic pressures used to latch and unlatch the panel fastener 600 of FIGS. 12-15. The bar chart 700 includes an outer bar and an inner bar for each stage, where the outer bar represents the pneumatic pressure applied in the pneumatic line 270 and the chamber 260, and the inner bar represents the pneumatic pressure inside the piston chamber 650. The bar chart 700 can be viewed in conjunction with the following flowchart diagram to fully understand the pressure sequence and actuation sequence of the fastener 600.

Figure 17:
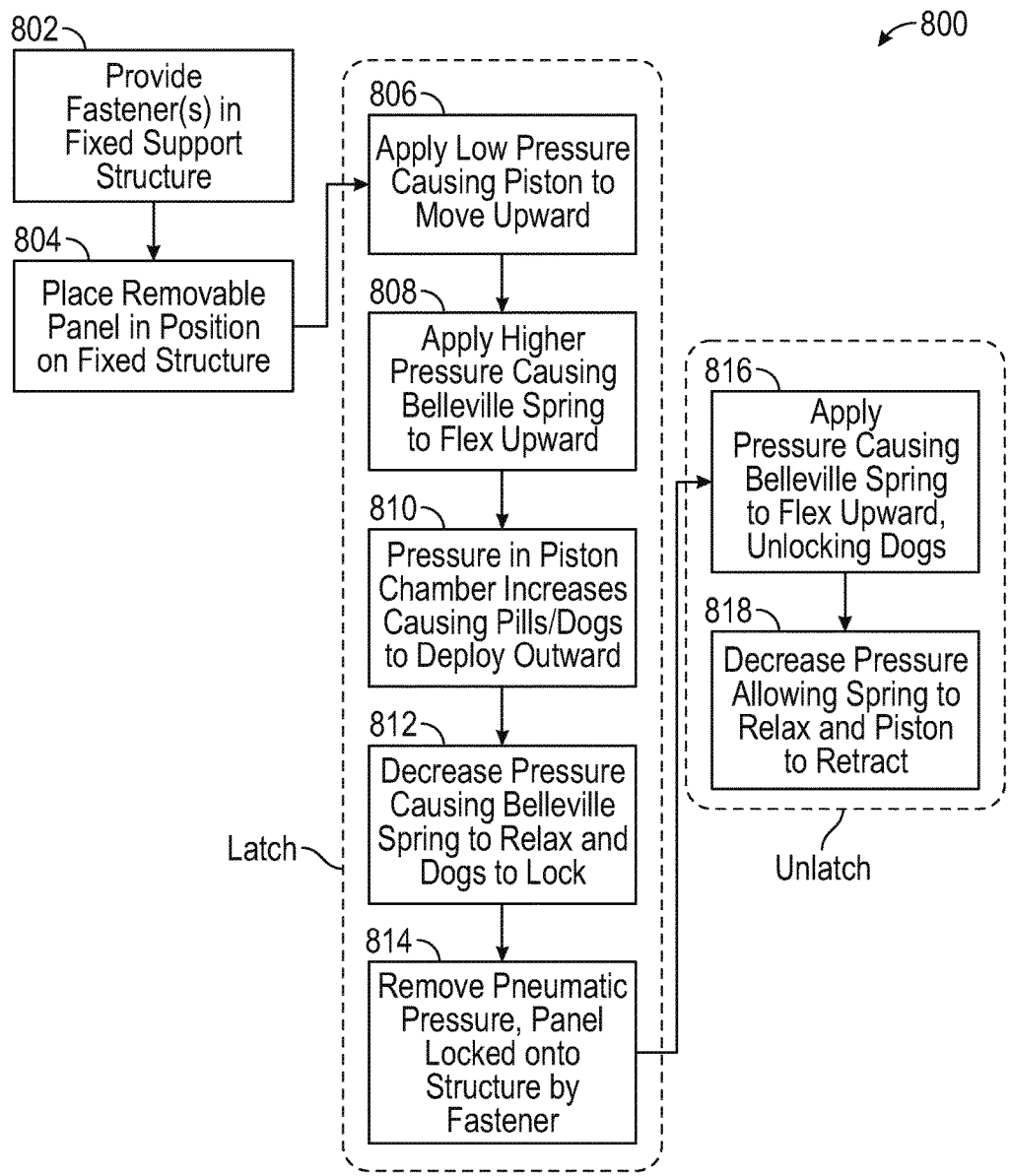
FIG. 17 is a flowchart diagram of a method used to latch and unlatch the panel fastener of FIGS. 12-15.

FIG. 17 is a flowchart diagram 800 of a method used to latch and unlatch the panel fastener 600 of FIGS. 12-15. At box 802, one or more of the fasteners 600 are provided in a fixed structure 200. At box 804, a removable panel 300 is placed in position on the fixed structure 200. The latching sequence begins at box 806, Stage 1 of deployment, where a low pneumatic pressure of about 10 psi is provided to the chamber 260, causing the piston assembly 640 to move upward through the central aperture in the Belleville spring 230 and the opening in the upper housing 210.

At box 808, Stage 2, a pneumatic pressure of about 100 psi is provided in the chamber 260. This Stage 2 pressure causes the Belleville spring 230 to deflect or flex upward, such that the upper end of the piston body 642, including the magnetic pills 252 and the locking dogs 254, moves fully up inside the retainer cavity 310. At box 810, Stage 3, the pneumatic pressure of about 100 psi is maintained in the chamber 260. The pressure inside the piston chamber 650 gradually increases as the 100 psi air flows in through the lower orifice 648. The pressure is felt by the inner surfaces of the magnetic pills 252. When the pressure in the piston chamber 650 reaches about 30 psi at Stage 3, this causes the magnetic pills 252 to break free and locking dogs 254 to deploy radially outward.

At box 812, Stage 4, the pneumatic pressure in the chamber 260 is reduced to a lower moderate level of about 70 psi. The Belleville spring 230 relaxes back toward its unflexed shape before the locking dogs 254 retract, thus causing the locking dogs 254 to engage with the mating lower lip of the retainer cavity 310. This pulls the removable panel 300 down onto the fixed structure 200 and prevents the locking dogs 254 from retracting back into the piston body 642. At box 814, Stage 5, the pneumatic pressure is removed from the chamber 260, and the removable panel 300 is fully latched onto the fixed structure 200 by the fastener 600. In the case of an access panel on an aircraft, the fastener system is flight-ready.

The unlatching sequence begins at box 816, where a pneumatic pressure of about 100 psi is provided in the chamber 260. This pressure causes the Belleville spring 230 to deflect or flex upward, such that the locking dogs 254 are freed from their position in the retainer cavity 310, thus allowing the locking dogs 254 to retract back within the piston body 642. At box 818, the pneumatic pressure in the chamber 260 is quickly reduced to allow the Belleville spring 230 to relax back to its unflexed shape before enough pressure develops inside the piston chamber 650 to redeploy the locking dogs 254, and the pneumatic pressure is further reduced to allow the piston assembly 640 to retract back into the chamber 260, thus completing the unlatching sequence.

The access panel fastener system described above provides numerous advantages to manufacturers of aircraft and other vehicles or machines which include access panels. These advantages include the bottom-grasping feature which allows for an unblemished outer panel surface, simple and rapid fastener actuation for both latching and unlatching, high reliability, built-in clamping pre-load of the access panel onto the structure, and full retractability of the fastener inside the supporting structure to enable use with highly curved access panels. In addition, the simplified design of the temporally staged fastener, with fewer parts and fewer required pneumatic pressure commands, provides additional benefits in terms of cost reduction and reliability improvement. The innovative design of the disclosed fastener systems deliver this combination of features which was previously unobtainable.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An access panel fastener system, said system comprising:
    a pneumatic chamber incorporated in a fixed structure;
    a Belleville spring retained around its outer periphery to the fixed structure, where a lower surface of said spring is in fluid communication with the pneumatic chamber and the spring is responsive to a pneumatic pressure in the chamber;
    a pneumatic piston slidably disposed through a central hole in the Belleville spring, a lower end of said piston being in fluid communication with the pneumatic chamber and responsive to the pneumatic pressure, where the piston deploys upward until a piston base flange contacts the lower surface of the Belleville spring when the pneumatic pressure in the pneumatic chamber exceeds a first pressure threshold, and where the Belleville spring deflects upward when the pneumatic pressure in the pneumatic chamber exceeds a second pressure threshold;
    a piston chamber located in a central bore of the piston with a lower orifice proximate the lower end of the piston and an upper orifice proximate an upper end of the piston, where pressurized air from the pneumatic chamber flows through the lower orifice into the piston chamber and flows out of the piston chamber through the upper orifice;
    a plurality of locking dogs slidably disposed in the upper end of the piston, where the locking dogs deploy radially outward when the pneumatic pressure in the piston chamber exceeds a third pressure threshold; and
    a retainer cavity mounted on a lower surface of a removable panel such that an opening of the cavity faces downward toward the fixed structure, and where the locking dogs when deployed engage with the retainer cavity to lock the removable panel to the fixed structure,
    where the fastener system latches the removable panel to the fixed structure upon application of a latching sequence of pneumatic pressures, and the fastener system unlatches the removable panel from the fixed structure upon application of an unlatching sequence of pneumatic pressures.

2. The fastener system of claim 1 wherein, following the latching sequence of pneumatic pressures, the Belleville spring remains partially flexed and provides a tensile force on the pneumatic piston such that the locking dogs pull the removable panel against the fixed structure with a clamping pre-load.

3. The fastener system of claim 1 wherein the latching sequence of pneumatic pressures includes increasing the pneumatic pressure in the pneumatic chamber to exceed the first threshold in order to deploy the piston upward, increasing the pneumatic pressure in the pneumatic chamber to exceed the second threshold in order to deflect the Belleville spring upward, maintaining the pneumatic pressure in the pneumatic chamber above the second threshold while a pressure in the piston chamber rises to exceed the third threshold in order to deploy the locking dogs radially outward, decreasing the pressure in the pneumatic chamber below the second threshold in order to relax the Belleville spring and cause the locking dogs to grasp a lip of the retainer cavity, and further decreasing the pressure to zero to complete the latching sequence.

4. The fastener system of claim 3 wherein the first threshold is in a range of 5-15 pounds per square inch (psi) of pneumatic pressure, the second threshold is in a range of 90-110 psi, and the third threshold is in a range of 25-35 psi.

5. The fastener system of claim 1 wherein the unlatching sequence of pneumatic pressures includes increasing the pressure in the chamber to exceed the second threshold in order to deflect the Belleville spring upward and allow the locking dogs to retract into the piston, decreasing the pressure to allow the Belleville spring to relax, and further decreasing the pressure to zero to complete the unlatching sequence.

6. The fastener system of claim 1 wherein the lower orifice has a diameter of 0.01 inches+/−20% and the upper orifice has a diameter of 0.019 inches+/−20%.

7. The fastener system of claim 1 further comprising magnetic pills attached to the locking dogs, where the magnetic pills provide a magnetic force to maintain the locking dogs in a radially inward position when the locking dogs are not exposed to a pneumatic pressure exceeding the third threshold.

8. The fastener system of claim 1 wherein the locking dogs have a shape which fits over a lower lip of the retainer cavity when in a latched condition such that the locking dogs cannot retract into the piston.

9. The fastener system of claim 1 wherein the fixed structure is part of an aircraft, the removable panel is an access panel with a smooth outer surface, and a plurality of the fastener systems are used to secure the access panel to the aircraft, where the plurality of fastener systems are interconnected along a pneumatic supply line such that all of the fastener systems latch or unlatch simultaneously upon application of one of the sequences of pneumatic pressures.

10. The fastener system of claim 9 wherein the pneumatic piston in each of the fastener systems is completely retracted into the fixed structure before the access panel is placed into position on the fixed structure, thereby enabling the access panel to have a highly curved shape.

11. An aircraft access panel fastener system, said system comprising:
a removable access panel located on an exterior surface of an aircraft;
a pneumatic supply line which provides a pneumatic pressure, said pneumatic supply line being incorporated in a fixed structure of the aircraft; and
a plurality of pneumatically-actuated fasteners for latching the access panel to the fixed structure, each of the fasteners comprising;
a pneumatic chamber incorporated in the fixed structure, where the pneumatic chamber is in fluid communication with the pneumatic supply line;
a Belleville spring retained around its outer periphery to the fixed structure, where a lower surface of said spring is in fluid communication with the pneumatic chamber and the spring is responsive to the pneumatic pressure in the pneumatic chamber;
a pneumatic piston slidably disposed through a central hole in the Belleville spring, a lower end of said piston being in fluid communication with the pneumatic chamber and responsive to the pneumatic pressure, where the piston deploys upward until a piston base flange contacts the lower surface of the Belleville spring when the pneumatic pressure in the pneumatic chamber exceeds a first pressure threshold, and where the Belleville spring deflects upward when the pneumatic pressure in the pneumatic chamber exceeds a second pressure threshold;
a piston chamber located in a central bore of the piston with a lower orifice proximate the lower end of the piston and an upper orifice proximate an upper end of the piston, where pressurized air from the pneumatic chamber flows through the lower orifice into the piston chamber and flows out of the piston chamber through the upper orifice;
a plurality of locking dogs slidably disposed in the upper end of the piston, where the locking dogs deploy radially outward when the pneumatic pressure in the piston chamber exceeds a third pressure threshold; and
a retainer cavity mounted on a lower surface of the access panel such that an opening of the cavity faces downward toward the fixed structure, where the locking dogs when deployed engage with the retainer cavity to lock the access panel to the fixed structure, and where the locking dogs have a shape which fits over a lower lip of the retainer cavity when in a latched condition such that the locking dogs cannot retract into the piston,
where the plurality of fasteners latches the access panel to the fixed structure upon application of a latching sequence of pneumatic pressures, and the plurality of fasteners unlatches the access panel from the fixed structure upon application of an unlatching sequence of pneumatic pressures.

12. The fastener system of claim 11 wherein the pneumatic pistons in each of the fasteners is completely retracted into the fixed structure before the access panel is placed into position on the fixed structure, thereby enabling the access panel to have a highly curved shape.

13. The fastener system of claim 11 wherein, following the latching sequence of pneumatic pressures, the Belleville spring in each of the fasteners remains partially flexed and provides a tensile force on the pneumatic piston such that the locking dogs pull the access panel against the fixed structure with a clamping pre-load.

14. The fastener system of claim 11 wherein the latching sequence of pneumatic pressures includes increasing the pressure in the supply line to exceed the first threshold in order to deploy the pistons upward, increasing the pressure in the supply line to exceed the second threshold in order to deflect the Belleville springs upward, maintaining the pneumatic pressure in the supply line above the second threshold while a pressure in the piston chambers rises to exceed the third threshold in order to deploy the locking dogs radially outward, decreasing the pressure in the supply line below the second threshold in order to relax the Belleville springs and cause the locking dogs to grasp a lip of the retainer cavities, and further decreasing the pressure in the supply line to zero to complete the latching sequence.

15. The fastener system of claim 11 wherein the unlatching sequence of pneumatic pressures includes increasing the pressure in the supply line to exceed the second threshold in order to deflect the Belleville springs upward and allow the locking dogs to retract into the pistons, decreasing the pressure in the supply line to allow the Belleville springs to relax, and further decreasing the pressure in the supply line to zero to complete the unlatching sequence.

16. A method for latching a removable access panel to a fixed structure, said method comprising:
providing a plurality of fasteners, where each of said fasteners includes a pneumatic chamber incorporated in the fixed structure, a Belleville spring retained around its outer periphery to the fixed structure where a lower surface of said spring is in fluid communication with the pneumatic chamber, a pneumatic piston slidably disposed through a central hole in the Belleville spring where a lower end of said piston is in fluid communication with the pneumatic chamber, a piston chamber located in a central bore of the piston with a lower orifice proximate the lower end of the piston and an upper orifice proximate an upper end of the piston, where pressurized air from the pneumatic chamber flows through the lower orifice into the piston chamber and flows out of the piston chamber through the upper orifice, a plurality of locking dogs slidably disposed in the upper end of the piston, and a retainer cavity mounted on a lower surface of the access panel such that an opening of the cavity faces downward toward the fixed structure;
placing the access panel in position on the fixed structure;

increasing a pneumatic pressure in a pneumatic supply line from zero to a first pressure, said supply line being in fluid communication with the pneumatic chamber of each of the plurality of fasteners, where the first pressure causes the pneumatic piston in each of the fasteners to deploy upward into the retainer cavity until a piston base flange contacts the lower surface of the Belleville spring;

increasing the pneumatic pressure in the supply line to a second pressure causing the Belleville spring in each of the fasteners to deflect upward;

maintaining the pneumatic pressure in the supply line above the second threshold while a pressure in the piston chambers rises to exceed a third threshold in order to deploy the locking dogs radially outward;

decreasing the pressure in the supply line below the second threshold in order to relax the Belleville springs and cause the locking dogs to grasp a lip of the retainer cavities; and further decreasing the pneumatic pressure in the supply line to zero.

17. The method of claim 16 wherein, following the decrease of the pneumatic pressure in the supply line to zero, the Belleville spring in each of the fasteners remains partially flexed and provides a tensile force on the pneumatic piston such that the locking dogs pull the access panel against the fixed structure with a clamping pre-load.

18. The method of claim 16 wherein the first pressure is in a range of 5-15 pounds per square inch (psi) of pneumatic pressure, the second pressure is in a range of 90-110 psi, and the third pressure is in a range of 25-35 psi.

19. The method of claim 16 further comprising a sequence for unlatching the removable access panel from the fixed structure, where the unlatching sequence includes:

increasing the pneumatic pressure in the supply line to the second pressure, causing the Belleville spring in each of the fasteners to deflect upward and releasing the locking dogs from the lower lip of the retainer cavity, thus allowing the locking dogs to retract into the piston;

decreasing the pneumatic pressure in the supply line to allow the Belleville springs to relax and the pistons to partially retract; and decreasing the pneumatic pressure in the supply line to zero to allow the pistons to fully retract into the fixed structure.

20. The method of claim 16 wherein the pneumatic piston in each of the fasteners is completely retracted into the fixed structure before the access panel is placed into position on the fixed structure, thereby enabling the access panel to have a highly curved shape.

* * * * *